A. E. BACON.

COMPRESSION STOP AND WASTE.

APPLICATION FILED FEB. 29, 1916.

Reissued May 30, 1916.

14,139.

INVENTOR

Albert E. Bacon

BY Wm. Clozidal

ATTORNEY

UNITED STATES PATENT OFFICE.

ALBERT E. BACON, OF GERMANTOWN, PENNSYLVANIA, ASSIGNOR TO HAINES, JONES & CADBURY, INCORPORATED, A CORPORATION OF PENNSYLVANIA.

COMPRESSION-STOP AND WASTE.

14,139. Specification of Reissued Letters Patent. Reissued May 30, 1916.

Original No. 1,096,885, dated May 19, 1914, Serial No. 499,125. Application for reissue filed February 29, 1916. Serial No. 81,276.

*To all whom it may concern:*

Be it known that I, ALBERT E. BACON, a citizen of the United States, residing at Germantown, in the county of Philadelphia, State of Pennsylvania, have invented a new and useful Compression-Stop and Waste, of which the following is a specification.

My invention relates to improvements in compression stops or valves.

The invention is especially applicable to stops of the globe valve type, and comprises convenient means for draining the pipe above the valve and for controlling said draining means independently of the movement of the main valve spindle.

Figure 1:
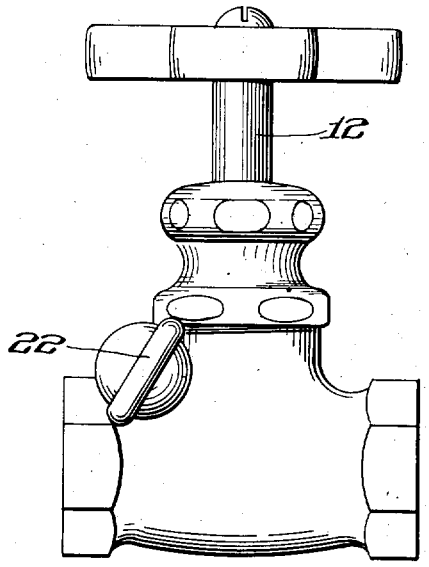
Figure 2:
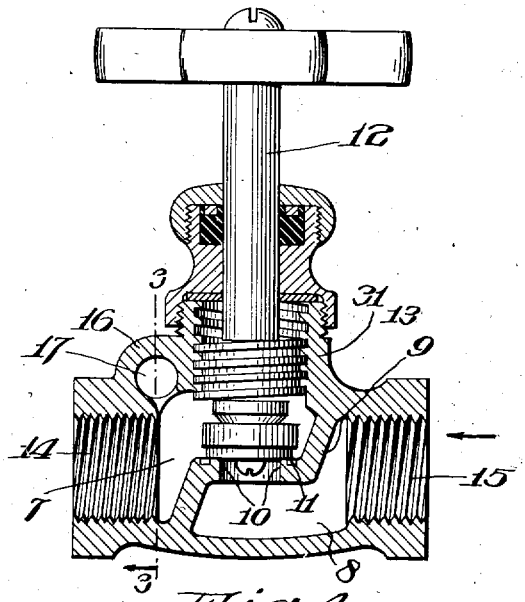
Figure 3:
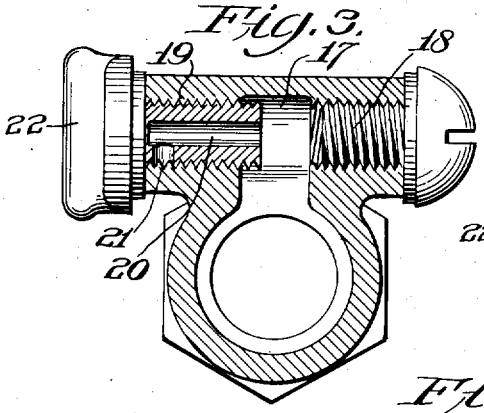
Figure 4:
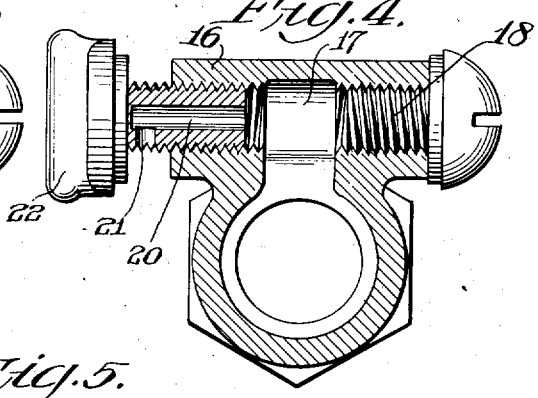
Figure 5:
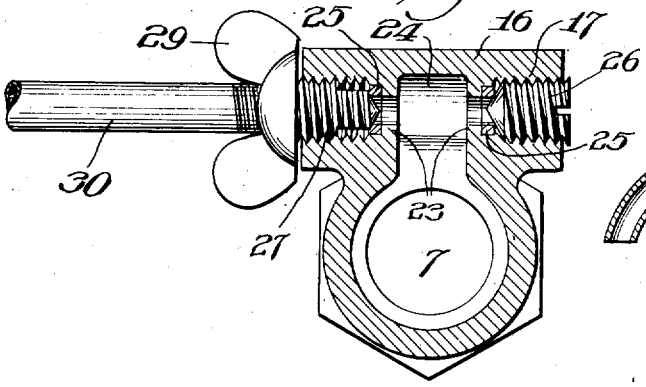
Figure 6:
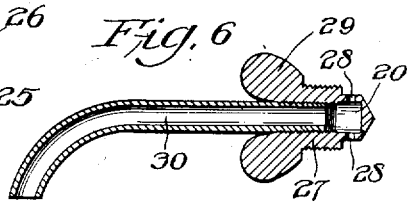

Referring to the drawings: Figure 1 is an elevation. Fig. 2 is a vertical section. Fig. 3 is a vertical section on line 3—3 of Fig. 2, on an enlarged scale. Fig. 4 is a similar view with the waste port open. Fig. 5 is a vertical section of an alternative structure. Fig. 6 is a vertical section of a detail of a part shown in Fig. 5 on a reduced scale.

Similar numerals refer to similar parts throughout the several views.

In Figs. 1 and 2, I show the usual form of globe valve, comprising a body 13 having the two chambers 7 and 8 separated by the diaphragm 9, in the horizontal portion of which is the valve seat 10, with which coöperates the valve 11, operated by the spindle 12, threaded in the neck 31 of body or casting 13. Chamber 7 is provided with the port, or pipe-opening 14, and chamber 8 is provided with the pipe-opening 15. These openings 14 and 15 are usually threaded for engagement with the threaded ends of piping. So far as above described this is the usual or common form of globe valve. In combination with such a structure however, I cast with the body or casting 13, the lug or enlargement 16. This lug is either cast with an opening or channel 17 extending through the same from end to end, as clearly shown in Figs. 2, 3 and 4, and the channel is made to communicate with chamber 7, or such an opening or channel may be formed in said lug in any suitable way. This channel 17, as shown in Figs. 2 to 4, is threaded at both ends, so that one end may receive the solid screw 18, while the other end receives the screw 19, provided with the longitudinally extending and centrally disposed channel 20. An aperture 21 is provided at the end of the channel near the thumb-piece 22 opening from the channel 20 through the periphery of the said screw 19. The screws 18 and 19 are the same diameter with the same pitch of thread so that they may be interchanged from one side to the other of the lug 16, as may be desired. It will thus be seen that when the screw 19 is screwed home as shown in Fig. 3, the globe valve operates in the ordinary way, simply to control the flow of water from pipe 15 to pipe 14, for example. When it is desirable however, after interrupting the flow between pipe 15 and pipe 14, to drain the water from pipe 14, it is only necessary to turn the thumb-piece 22, until the screw 19 has been withdrawn sufficiently to bring the aperture 21 beyond the end of lug 16, as shown in Fig. 4. While in this position, the water in chamber 7, and consequently the water flowing from pipe 14 will find an exit through aperture 21. It will be noted that the control of the waste or draining of the water from the valve chamber is absolutely independent of the movement of the main valve 11.

As above described the screw 18 and screw 19 may be reversed in position to suit any desired arrangement of piping to secure accessibility for the thumb-piece 22.

As lug 16 and waste channel 17 are located entirely to one side of threaded spindle 12, either of the reversible screws may be inserted well within channel 17. Referring, for example, to Figs. 3 and 4, it will be seen that screw 19 is considerably longer than screw 18 and that it may be withdrawn a sufficient distance to entirely expose channel 21 without such loosening of the screw in channel 17 as would tend to permit its accidental displacement from the waste channel.

In Figs. 5 and 6, I show a slight modification of structure, in which the lug 16 is provided with the channel 17; said channel however is provided with restrictions or flanges 23 and an intermediately disposed chamber 24, the chamber 24 communicating with the chamber 7. These flanges 23 serve for supporting the washers 25 which make convenient valve seats for the screws 26 and 27; the inner ends of which are slightly conical. The screw 27 is similar in principle to screw 19, except the channel 20 is closed at the inner end and has communication with channel 17 by aperture or apertures 28, and opens at its outer end between the wings of the thumb piece 29. This opening is also threaded to receive the threaded end of drain pipe 30. This structure is all clearly shown in Fig. 6.

What I claim is:—

1. A compression stop, comprising an integral body provided with communicating supply and service chambers and a waste channel open at each end and communicating intermediate said ends with the service chamber, a valve for controlling communication between said chambers, means to one side of the waste channel for moving the valve, and reversible plugs for engagement in said channel, one of said plugs being suitably apertured to permit of communication between the service chamber and the exterior of said body upon the partial withdrawal of the plug from the waste channel.

2. The combination of a chambered body portion, provided with supply and service chambers having valve controlled communication, and an operating stem neck, a valve, an operating stem therefor operating in said neck, a waste channel to the neck side of said body portion and in constant communication with the service chamber, extending through the body portion and having its axis passing the valve stem to one side thereof and at an angle thereto, and means for arbitrarily controlling the discharge from the waste channel.

3. A compression stop comprising a body having a waste channel therein threaded at both ends, a waste chamber intermediate said ends, annular flanges between said chamber and threaded ends, said flanges forming restricted openings between the waste chamber and said ends of the channel, and means for controlling the waste comprising reversible plugs engaging the ends of said channel and normally closing the same, one of said plugs having a contracted portion adapted to open or close communication through one of said restricted openings and to form an annular chamber between said contracted portion and the wall of the channel, said plug provided with a channel communicating with said annular chamber and the exterior of said body.

4. In a compression stop and waste, a casting provided with supply and service pipe opening extensions, communicating supply and service chambers communicating therewith, an operating stem neck, and a lug between the neck and the service pipe opening extension, at right angles to said neck and extension, said lug provided with a waste channel opening directly into the service chamber, a valve for controlling communication between the supply and service chambers, a valve stem operating in said neck and means for arbitrarily controlling the discharge from the waste channel.

5. In a compression stop and waste, a casting provided with supply and service pipe opening extensions, communicating supply and service chambers communicating therewith, an operating stem neck, and a lug integral with the casting between the neck and the service pipe opening extension, said lug provided with a waste channel opening directly into the service chamber, a valve for controlling communication between the supply and service chambers, a valve stem operating in said neck and means for arbitrarily controlling the discharge from the waste channel.

ALBERT E. BACON.

Witness:
MAE HOFMANN.